United States Patent Office 2,890,121
Patented June 9, 1959

2,890,121

ANIMAL CASING AND METHOD OF PRODUCING SAME

Cleo A. Rinehart, Chicago, Ill., assignor to Swift & Company, Chicago, Ill., a corporation of Illinois No Drawing. Application July 20, 1956
Serial No. 599,008

7 Claims. (Cl. 99—175)

This invention relates in general to the production of molded casings from strips of natural casing. More particularly, this invention relates to a product formed of animal intestines wherein the product ultimately secured is of a different, generally considerably larger, diameter than the natural animal casing.

It has been proposed to join together part or all of several animal casings so as to form a casing material of considerably larger diameter than is ordinarily available. The most common way to achieve this is by sewing. It has also been suggested that casings might be split and the longitudinal edges thereof pieced together with other strips of casing whereby to form a product of rather large diameter. The customary procedure for joining these pieces is through sewing. Also recommended has been to reinforce the sewn seam through the use of sealing strips caused to adhere to the casing by glue or tannin. Because of the obvious complexity of processes of this type, large diametered casings are in short supply and an easier way to achieve the same objective has been sought.

It is therefore an object of this invention to provide a method whereby pieces of casing of the natural variety may be joined together to form a molded casing of different than ordinary diameter.

Another object of this invention is to provide a method for the joining together of pieces of casing into a product of desired size which does not necessitate a sewing operation or the use of an ordinary glue or tannin.

A further object of this invention is to provide a casing product of desired diameter, either larger or smaller than untreated animal intestines, which is sturdy, pliable and of a glossy appearance.

Additional objects and advantages of this invention, if not specifically set out, will become apparent during the course of the discussion which follows.

Broadly this invention is dependent upon the discovery that a concentrated solution of urea, when applied to intestines of hogs, cattle and sheep, has the ability to form (with the surface material of the casings) a gelatinous urea-protein complex which will firmly adhere to other casing material, particularly if such casing material has itself been treated with the urea solution. Thus by soaking split casings in a concentrated solution of this variety and subsequently piecing together the longitudinally cut edges, it is possible to secure a product of diameter considerably greater than that which is ordinarily obtainable. Preferably, after the longitudinal surfaces are pieced together the wet casing is placed upon a form which has been pretreated with a white mineral oil or an edible animal or vegetable oil. The casing therefore is easily removable after it has dried and the oil permeates and coats the casing to make it pliable and glossy.

More particularly, this invention is the result of the discovery that gluing, sewing, etc. may be eliminated through the use of a concentrated urea solution. The casings are soaked in such a solution prior to being pieced together. This urea bath results in the in situ formation of a urea-protein complex on the casing so as to form self-adhering surfaces. The joining together of the strips, therefore, instead of being dependent upon tannin, glue or sewing is an autogenous joining. As specified above, the urea solution is preferably concentrated. Broadly, between 1% and 50% urea-containing aqueous solutions may be satisfactorily used under proper conditions of temperature and using appropriate soak periods. Desirable is a 20–33% aqueous solution since it is most easily handled. When such concentration levels are used the urea begins to act upon the protein of the casing shortly after the casing is immersed and the casing may be left in the bath for as long as two days at cooler temperature (35°–45° F.) without the strength of the ultimate product being noticeably reduced. In the case of a 50% urea solution at room temperature, a very few minutes is satisfactory to soften the protein and form the complex which has the adhesive properties mentioned above and periods of several hours or elevated temperatures using such a concentrated bath will disintegrate the casings into a paste-like substance. Where concentrations of lower orders are used, such as those below the preferred range of 20–33%, several days' soaking at low temperatures may be necessary to insure that the casing edges will stick to one another after they are overlapped. As with most such reactions, the temperature selected has a direct effect upon the speed of the reaction. Temperatures between 28° F. and 130° F. for periods of one minute to several days have been found effective for urea solutions of varying degrees of concentration. Room temperature is satisfactory and is preferred as are bath concentrations of 20–33% and immersion periods of one hour to two days. Most preferred is a 30% urea solution, a bath temperature of 40° F. and an immersion time of 16 to 24 hours. However, it is apparent that the concentration of urea in the solution, the time of soaking, and the temperature of the bath are not critical conditions and are readily ascertainable by routine experimentation. Following treatment in the urea solution, the casings are washed in water for a few minutes to remove any excess solution. Next, the pieces are placed upon a form, preferably wood, and the longitudinally split edges are overlapped to form an endless article. The form, of course, should ordinarily be cylindrical so that the casings may assume the shape which they will have at the time of their ultimate use. The forms should be covered with a small amount of white mineral oil or edible animal or vegetable oil so as to allow for the easy removal of the casing after the drying operation. Other suitable oils are lard, oleo, cottonseed, soybean, peanut, coconut and corn oil. The presence of this oil also promotes pliability and a glossy appearance. After the casings have been mounted upon such forms, the drying operation may be allowed to proceed until the casings are dry to the touch and the joints are of a sufficiently self-sustaining nature to allow for removal and handling. Bearing in mind the fact that the properties just described are sought in the finished product together with adequate pliability or lack of brittleness (which may result from drying under extreme conditions) it may be stated that drying may be carried out at ordinary room temperature for periods of 6 to 72 hours. However, one day is ordinarily adequate. Also satisfactory are accelerated drying conditions using a stream of hot air provided care is taken that the casings are not allowed to become unreasonably dry and brittle.

Following completion of the operations described, the hog, beef or sheep casings are stuffed with sausage in the usual fashion. Suitable well known tyes of sausage are Salami dry sausage, cooked Salami, Thuringer, Cervelat, Goteborg, Genoa, Bologna, frankfurter sausage and fresh and smoked pork sausage.

The casings may be treated in the urea solutions as described immediately after being cleaned. As a practical matter, however, in commercial operations they are usually salted and held until they are ready to be used. In this event, they should be soaked in water to remove excess salt before proceeding with the described treatment.

The examples set forth below are merely for illustrative purposes and are not to be construed as placing limitations upon the invention other than as set forth in the appended claims.

*Example I*

Salted wide pork casings were split and cut into desired lengths, about 22 inches to 26 inches, and were thereafter soaked in a 30% aqueous solution of urea for a period of about 24 hours at 40° F. The original diameters of these casings fell within the range 1.4 inches to 2 inches. It was observed that treatment with the urea solution for about 24 hours caused the beginning of the formation of a gelatinous like surface on the casing. The urea-treated casings were then soaked in water to remove the excess of the urea and then were next positioned lengthwise in overlapping relationship on wooden forms. The forms were cylindrical in shape having one rounded end so that a casing product closed at one end could be formed. Prior to application of the moist casing material, the forms were covered with white mineral oil to insure that the casings would not stick after drying. Following drying for a period of 12 hours at room temperature, the casings were slipped off the forms and the open ends trimmed evenly with shears. The casings, due to the presence of the oil, were pliable and of a glossy appearance.

*Example II*

Additional casings were soaked in a 50% urea solution for a period of one minute at room temperature. The gelatinous-like surface on the casings was observed at this point, the casings were removed from the urea solution, washed and placed on the forms and dried for 12 hours at room temperature. All told, some ten pieces of 2¾-inch diameter and ten 3¼ to 3½ inch diameter casings were treated and thereafter stuffed with salami meats. The products were all held for a period of time sufficient to qualify them as "of shipping age," a period of about 25 to 60 days. The color and appearance of both types of salami were considered equal to the best commercially available.

In the description above, attention has been directed primarily to the longitudinal splitting of casings and the piecing of them together to form a final casing product of larger than normal diameter. It is to be borne in mind that it is equally possible to split a larger casing and form this piece into a casing of less than normal diameter by the overlapping and drying operation described earlier. Of course, the process may be employed to patch or mend casings which have become damaged, if so desired. As one additional use of the process of this invention, it is possible to form continuous sheets of casing material by piecing together split casings and then subsequently forming the tubular casing to be used in conjunction with continuous stuffing operations. Preferably, this type of operation is analogous to the continuous formation of artificial casings at the time of stuffing in a continuous stuffing process. In this operation, any convenient means may be selected for making the final bond whereby to form the tubular body. For example, it is possible to use the method of this invention, or alternatively, sewing or otherwise sealing the edges together. If the process as described above is carried out, the product will possess an excellent sheen and be pliable and will have the desired sturdiness with noticeable seams. Also, it is possible to soak casings in the urea solution prior to splitting them, but obviously it is more satisfactory to split the casings before their surfaces are rendered gelatinous by the action of the solution.

Obviously many modifications and variations of the invention as hereinbefore set forth may be made without departing from the spirit and scope thereof, and therefore only such limitations should be imposed as are indicated in the appended claims.

I claim:

1. A casing formed of animal intestine material but of a diameter differing therefrom comprising: a split natural casing overlapped to form an endless article and bonded at the point of union with a urea-protein complex.

2. A casing formed of animal intestine material but of a diameter differing therefrom comprising portions of split natural casings pieced together to form an endless article and bonded at the points of union with a urea-protein complex.

3. A method of producing casings from animal intestines wherein the casing products obtained are of diameters different than the untreated intestines comprising: soaking said intestines in an aqueous solution of urea whereby to form a gelatinous surface on the said intestine material; splitting said intestine material to form sheets; overlapping the edges of said sheets with one another to form an endless article and drying said joined intestine material whereby to bond the overlapped edges and form cylindrical casings of diameters different than the untreated intestines.

4. A method of producing a meat-containing product in a casing prepared from animal intestine material which comprises: soaking said animal intestine material in a concentrated aqueous solution of urea whereby to form a gelatinous surface on the said intestine material; washing said intestine material to remove excess urea therefrom; forming said intestine material into sheets; overlapping the edges of the sheets so formed with one another to form an extended sheet; drying said extended sheet whereby to bond the overlapped edges of the individual small sheets comprising the extended sheet; thereafter forming a cylindrical casing body by joining the longitudinal edges of said extended sheet; and stuffing said casing so formed with said product.

5. A method of producing casings from animal intestines wherein the casing products obtained are of diameters different from the untreated intestines comprising: soaking said intestines in a 20–33% aqueous urea solution at room temperature for a period of between about 1 hour and two days, splitting said intestine material to form sheets, overlapping the edges of said sheets with one another to form an endless article and drying said joined intestine material whereby to bond the overlapped edges and form cylindrical casings of diameters different from the untreated intestines.

6. A method of producing casings from animal intestines wherein the casing products obtained are of diameters different from the untreated intestines comprising soaking said intestines in a 1–50% aqueous urea solution at temperatures between about 28° F. and 130° F. for a period of between about 1 minute and several days, slitting said intestine material to form sheets, overlapping the edges of said sheets with one another to form an endless article, and drying said joined intestine material whereby to bond the overlapped edges and form cylindrical casings of diameters different from the untreated intestines.

7. A method of producing casings from animal intestine material which comprises: soaking said animal intestine material in a concentrated aqueous solution of urea whereby to form a gelatinous surface on the said intestine material; washing said intestine material to remove excess urea therefrom; forming said intestine material into sheets; overlapping the edges of the sheets so formed with one another to form an extended sheet; drying said extended sheet whereby to bond the overlapped edges of the individual small sheets comprising the extended sheet; and thereafter forming a cylindrical casing body by joining the longitudinal edges of said extended sheet.

References Cited in the file of this patent

UNITED STATES PATENTS

| | | |
|---|---|---|
| 1,076,005 | Deutsch | Oct. 14, 1913 |
| 1,204,812 | Mumm | Nov. 14, 1916 |

OTHER REFERENCES

"Uses and Applications of Chemicals and Related Materials," 1939, by T. C. Gregory, published by Reinhold Publishing Corp., 330 West Forty-Second Street, New York, page 629, article entitled "Urea."

UNITED STATES PATENT OFFICE

CERTIFICATE OF CORRECTION

Patent No. 2,890,121 June 9, 1959

Cleo A. Rinehart

It is hereby certified that error appears in the printed specification of the above numbered patent requiring correction and that the said Letters Patent should read as corrected below.

Column 4, line 11, for "with noticeable seams" read -- without noticeable seams --.

Signed and sealed this 13th day of October 1959.

(SEAL)
Attest:

KARL H. AXLINE
Attesting Officer

ROBERT C. WATSON
Commissioner of Patents